Patented Jan. 14, 1936

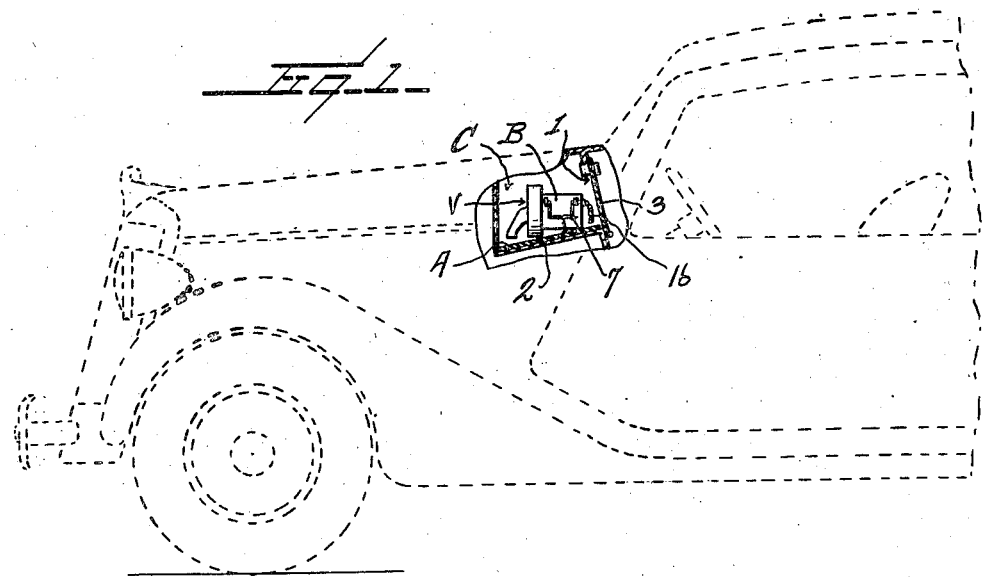
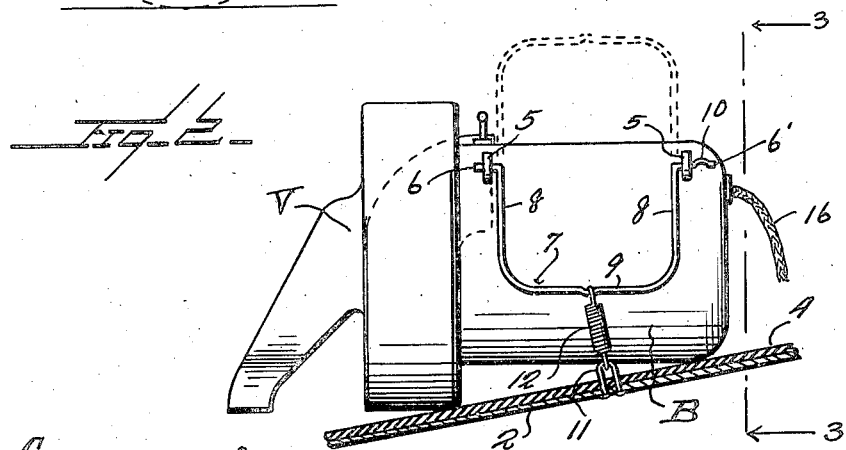
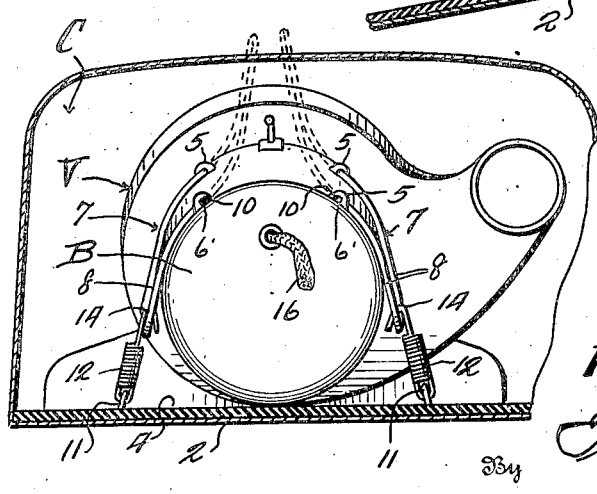

2,027,602

UNITED STATES PATENT OFFICE 2,027,602

VACUUM SWEEPER

Maurice L. Marotte, Carlisle, Pa., assignor of one-fourth to Arnold Bamberger and one-fourth to F. Lourene Woods, both of Carlisle, Pa.

Application October 1, 1935, Serial No. 43,096

5 Claims. (Cl. 15—15)

This invention relates to vacuum sweepers, and it is primarily an object of the invention to provide a sweeper of this kind which can be employed with convenience and advantage for the purpose of cleaning upholstery within the body of an automobile and wherein provision is made to permit the sweeper to be conveniently stored when not in use within a compartment provided in the dash of the body or otherwise as may be preferred.

It is also an object of the invention to provide a vacuum cleaner comprising handle members carried thereby which can be readily employed for the required manipulation of the sweeper during a cleaning operation and wherein said handle members also provide effective means for securing or anchoring the sweeper in place and against vibration when in storage.

The invention consists in the details of construction and in the combination and arrangement of the several parts of my improved vacuum sweeper whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a fragmentary view and of somewhat a diagrammatic character illustrating my invention as herein embodied, the associated motor car being indicated by broken lines;

Figure 2 is an enlarged fragmentary view partly in side elevation and partly in section illustrating a vacuum cleaner at rest within the compartment;

Figure 3 is a sectional view taken substantially on the line 3—3 of Figure 2 looking in the direction of the arrows.

As disclosed in the accompanying drawing, C denotes a compartment opening, as at 1, through the dash within the body of an automobile and, as herein disclosed, said compartment C has its bottom wall or floor 2 inclined upwardly from the lower margin of the opening 1. This opening 1 may be readily closed by a suitably supported door 3. The floor 2 has disposed thereover a lamination 4 of rubber or other suitable yielding material to facilitate the maintenance without vibration of the vacuum sweeper V within the compartment C.

The sweeper V may be of any preferred type although it should be compact in assembly and of a relatively small size to facilitate its ready use in connection with the upholstery within the body of an automobile and of course to require a relatively small amount of space for storage within the compartment C.

The body casing B of the cleaner at each side thereof and adjacent to its top is provided with a pair of longitudinally spaced ears or clips 5 through which are freely directed angularly disposed extensions 6 and 6' provided at the ends of a substantially U-shaped handle member 7. The side arms 8 of the handle member are disposed longitudinally on such curvature as to closely conform to the periphery of the body casing B when the handle member is in its lowered position and also to permit the intermediate bar 9 of one of the handle members to closely approach the similar bar of the second handle member so that both of the bars may be readily grasped by a hand to facilitate the desired manipulation of the cleaner during a sweeping or cleaning operation. One of the angular extensions, as 6', of each of the handle members 7 is provided intermediate its ends with an offset portion 10 for coaction with the adjacent portion of the body casing B of the cleaner to maintain the handle member 7 against dropping from its raised position.

Anchored, as at 11, to the floor 2 of the compartment C are the retractile members 12, herein disclosed as coil springs. These members or springs 12 are spaced apart transversely a distance in excess of the diameter of the body casing B of the cleaner so that the hook members 14 carried by the outer extremities of the members or springs 12 may readily engage the bars 9 of the handle members 7 when in their lowermost position.

When the hook members 14 are engaged with the bars 9 of the handle members 7 said members or springs 14 are placed under such tension to effectively hold the sweeper upon the floor 2 of the compartment C or more particularly the lamination 4 whereby the sweeper when not in use is effectively held in storage and out of the way within the compartment C and in a manner to eliminate vibration of the sweeper within the compartment C while the automobile is in transit.

The sweeper is of an electrical type and obtains its energy through the cable 16 leading from the motor of the sweeper to any suitable source of electrical energy carried by the automobile, as for example a battery placed either under the back seat or in the dash compartment. This cable 16 is of course to be of a length to permit the cleaner to be carried to any point within the body of the car and if desired mechanical means may be used to effect a winding of that portion of the cable not retracted from within the compartment.

From the foregoing description it is thought to be obvious that a vacuum sweeper constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a vacuum sweeper, handle members pivotally connected with the upper portions and at the opposite sides thereof, said handle members having bars closely approaching one another when said handle members are in their raised position, said handle members when in their lowered position closely conforming to the sweeper.

2. In combination with a vacuum sweeper, handle members pivotally connected with the upper portions and at the opposite sides thereof, said handle members having bars closely approaching one another when said handle members are in their raised position, said handle members when in their lowered position closely conforming to the sweeper, and means associated with each of the handle members to hold the same from dropping when in raised position.

3. In combination with a vacuum sweeper, members pivotally connected thereto for swinging movement toward and from the cleaner, said members when in one position providing handle members for manipulating the cleaner and when in a second position providing means for holding the cleaner in a fixed position.

4. In combination, a supporting surface, a vacuum cleaner to rest on said surface, members pivotally connected to the cleaner for movement toward or from the cleaner, said members when moved away from the cleaner cooperating to provide a hand grasp, and resilient members engaging the pivoted members when moved toward the cleaner to hold the cleaner to the supporting surface.

5. In combination, a supporting surface, a vacuum cleaner to rest on said surface, members pivotally connected to the cleaner for movement toward or from the cleaner, said members when moved away from the cleaner cooperating to provide a hand grasp, resilient members engaging the pivoted members when moved toward the cleaner to hold the cleaner to the supporting surface, and a lamination of yielding material disposed over said supporting surface and upon which the cleaner directly contacts.

MAURICE L. MAROTTE.